L. R. EVANS.
COMBINED PULLEY AND SPROCKET WHEEL.
APPLICATION FILED FEB. 10, 1916.

1,196,937.

Patented Sept. 5, 1916.

INVENTOR
Leigh R. Evans
BY
Lyman E. Dodge
ATTORNEY

UNITED STATES PATENT OFFICE.

LEIGH R. EVANS, OF ROCHESTER, NEW YORK, ASSIGNOR TO CYCLEMOTOR CORPORATION, OF ROCHESTER, NEW YORK, A CORPORATION OF NEW YORK.

COMBINED PULLEY AND SPROCKET-WHEEL.

1,196,937.   Specification of Letters Patent.   Patented Sept. 5, 1916.

Application filed February 10, 1916. Serial No. 77,421.

*To all whom it may concern:*

Be it known that I, LEIGH R. EVANS, a citizen of the United States, and a resident of the city of Rochester, in the county of Monroe and State of New York, have invented a new and useful Combined Pulley and Sprocket-Wheel, of which the following is a specification.

This invention relates to devices for transmitting power, and more particularly to a combined belt pulley and sprocket wheel suitable for transmitting power from a sprocket chain to a belt, or vice versa.

One of the objects of this invention is a novel, cheap and durable combined belt pulley and sprocket wheel which is constructed so as to be compact and strong compared with its weight.

Other objects and advantages of the invention will appear as the description progresses, and the novel features will be pointed out in the appended claims.

Figure 1:
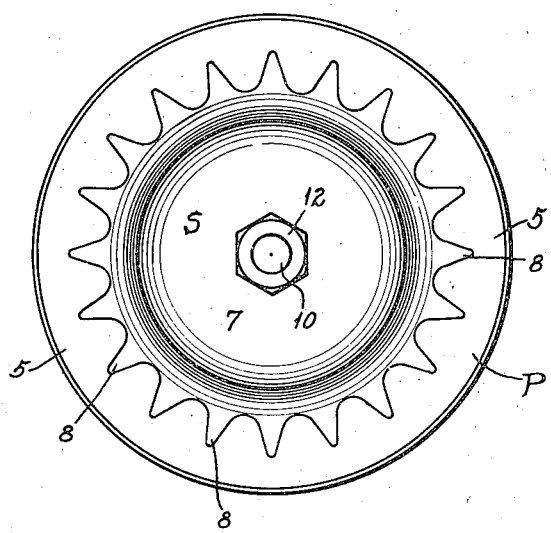
Figure 2:
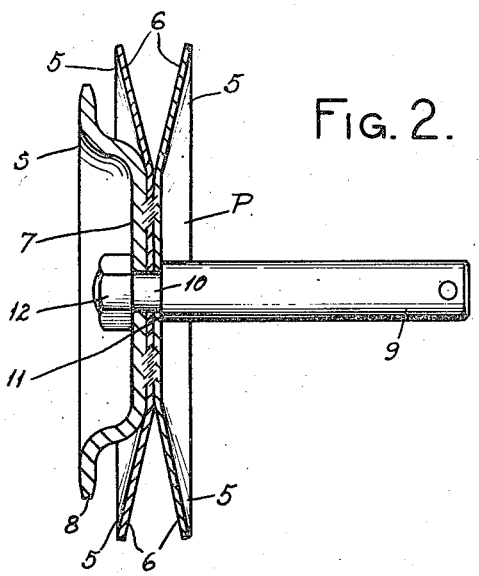

In the accompanying drawing in which is illustrated the preferred physical embodiment of the invention and in which like reference characters refer to like parts wherever they occur, Figure 1 is an end or face view of a combined belt pulley and sprocket wheel embodying the invention; and Fig. 2 is a diametrical section.

Referring to the accompanying drawing, the belt pulley P comprises two counterpart halves 5, each of which is preferably made of resilient sheet metal and has the shape of a dished disk; and these halves 5 are placed together back to back and are suitably fastened together, preferably by the well known method of spot welding. The edge portions of these halves 5 flare outward, thereby leaving between these edge portions a belt groove 6 which is adapted to receive a belt (not shown) and is V-shaped in cross section. It can be easily seen that these two halves 5 of the belt pulley P can be easily and cheaply pressed or stamped from sheet metal, and when fastened together constitute a light and yet comparatively stiff and strong belt pulley. The belt groove 6, being V-shaped in cross section, grips the belt tightly as it is drawn radially into said groove by the driving force; and as the driving force increases, the gripping action also increases, so that the belt is not likely to slip, even though subjected to excessive pull at times. This gripping action of the sides of the belt groove 6 makes it unnecessary to have the belt very tight in order to transmit the desired power, thereby obtaining a very appreciable saving in friction loss where varying amounts of power are to be transmitted. This may be better appreciated if it is considered that with the ordinary belt pulley having a rounded bottom it is necessary to have the belt so tight that it will not slip when it is called upon to transmit the maximum power; and consequently, the belt is unnecessarily tight when transmitting only a part of the maximum power, and a large amount of power is wasted in useless friction when any less than the maximum power is being transmitted. In the particular application of the invention which I contemplate, that is, in transmitting power from a motor on a bicycle to a wheel of the bicycle, and in other applications where a variable amount of power is to be transmitted, this gripping action of the sides of the belt groove 6 on the belt is a feature of great importance.

The sprocket wheel S is preferably stamped or pressed from a metal plate and has its central portion 7 dished or cupped, as clearly shown in Fig. 2. The sprocket wheel S is fastened, as by spot welding, to the face of one half 5 of the belt pulley P, there being at the same time sufficient clearance for the sprocket chain between the adjacent edge of the belt pulley P and the teeth 8 of the sprocket wheel S. This arrangement and construction of parts forms a very compact combined belt pulley and sprocket wheel, which, as a unitary structure, may be journaled on a shaft, and which does not require that the belt pulley and sprocket wheel be fastened separately to the shaft, thereby avoiding subjecting the shaft and the connections between it and the pulley and sprocket wheel to a torque equivalent to the driving force transmitted. Also, since the respective portions of the belt pulley and sprocket wheel which are in contact consist of the greater part of the faces of these elements, they may be fastened together at points comparatively close to their outer edges and far from the center; and in this way both elements may be constructed of relatively thin metal without requiring special provision, such as enlarged hubs, for attaching them together or to a shaft.

While, as pointed out hereinbefore, it is possible to journal the belt pulley P and the sprocket wheel S as a unitary structure on a shaft, such an arrangement does not afford sufficient bearing surface for the best results; and I prefer to secure the belt pulley and the sprocket wheel to a shaft, as 9, which is journaled in suitable bearings (not shown), so that the shaft 9 rotates in its bearings instead of the belt pulley and sprocket wheel rotating about the shaft. In the construction shown, one end portion 10 of the shaft 9 is made smaller in diameter than the remainder of said shaft, thereby forming a shoulder 11; and the outer end of this reduced portion 10 is threaded. The belt pulley and the sprocket wheel each has a central hole therein large enough to fit snugly over the reduced portion 10 of the shaft 9; and are together placed on this reduced portion and clamped in place against the shoulder 11 by the nut 12. After the parts are assembled, the end of the reduced portion 10 of the shaft 9 is headed over or riveted to prevent the nut 12 from working off. It can be seen that it is not necessary that the belt pulley P and the sprocket wheel S, should be clamped very tightly on the reduced portion 10 of the shaft 9, because the only tendency for them to turn about the said reduced portion is only that caused by the friction between the shaft 9 and its bearings.

The simplicity of the whole construction, and the ease with which the different parts can be made and assembled is apparent, and other advantages of the construction can be readily observed and do not require detailed explanation.

Obviously, various changes may be made in the particular construction shown and described without departing from my invention, and I do not wish to be restricted to the details of this construction shown and described.

What I claim is:

1. In a device for transmitting power, a combined belt pulley and sprocket wheel formed of relatively thin metallic plates and having counterpart contacting faces fastened together.

2. In a device for transmitting power, a belt pulley having a dished face, and a sprocket wheel having a dished face arranged in contact with the dished face of said pulley and fastened thereto.

3. In a device for transmitting power, a belt pulley made of two counterpart halves of sheet metal fastened together, and a sprocket wheel having its central portion dished and arranged in contact with one face of said pulley, said sprocket wheel and said pulley being fastened together.

4. In a device for transmitting power, a belt pulley made of two counterpart halves of sheet metal, each having a dished face, said halves of said pulley being fastened together back to back, and a sprocket wheel having a dished central portion arranged in contact with one of the faces of said pulley and fastened thereto.

5. In a device for transmitting power, a belt pulley made of two dished disks of resilient sheet metal fastened together back to back, and a sprocket wheel fastened to one face of said pulley.

6. In a device for transmitting power, a combined belt pulley and sprocket wheel formed of relatively thin metallic plates fastened together, a shaft, and means for fastening said pulley and wheel to said shaft.

7. In a device for transmitting power, a belt pulley made of two dished disks of sheet metal fastened together back to back, a sprocket wheel fastened to one face of said pulley, a shaft, and means for clamping said pulley and sprocket wheel to said shaft.

LEIGH R. EVANS.